United States Patent
Rau et al.

(10) Patent No.: US 6,848,558 B2
(45) Date of Patent: Feb. 1, 2005

(54) SINTERED SELECTOR OR SLIDING SLEEVE

(75) Inventors: Günter Rau, Füssen (DE); Lorenz Sigl, Lechaschau (AT); Heinrich Wiedemann, Füssen (DE)

(73) Assignee: Sinterstahl GmbH, Fuessen (DE)

( * ) Notice: Subject to any disclaimer, the term of this patent is extended or adjusted under 35 U.S.C. 154(b) by 11 days.

(21) Appl. No.: 10/401,190

(22) Filed: Mar. 27, 2003

(65) Prior Publication Data

US 2003/0183479 A1 Oct. 2, 2003

(30) Foreign Application Priority Data

Mar. 27, 2002 (AT) ........................ GM199/2002

(51) Int. Cl.⁷ .................... F16D 23/02; F16H 55/08
(52) U.S. Cl. ........................... 192/108; 74/462
(58) Field of Search ................ 192/69.9, 69.83, 192/108, 69.7; 74/339, 438, 457, 462; 419/26, 28

(56) References Cited

U.S. PATENT DOCUMENTS 5,701,574 A * 12/1997 Derflinger et al. ............ 419/26
5,960,925 A 10/1999 Helms et al.
6,370,979 B1 * 4/2002 Tauschek et al. ............. 74/462

FOREIGN PATENT DOCUMENTS

| AT | 409 234 B | 6/2002 |
| DE | 44 18 632 A1 | 12/1994 |
| DE | 197 00 769 A1 | 5/1998 |
| DE | 199 33 468 A1 | 1/2001 |
| WO | 02/31374 A1 | 4/2002 |

* cited by examiner

Primary Examiner—Rodney H. Bonck
(74) Attorney, Agent, or Firm—Laurence A. Greenberg; Werner H. Stemer; Ralph E. Locher

(57) ABSTRACT

A sintered selector or sliding sleeve, or gear shift sleeve, has internal claw toothing. The individual teeth are delimited on their ends with secondary surfaces having ends that extend radially inward and outward from the root circle of the inner tooth surfaces. The novel geometry of the secondary surfaces extending radially outward from the root circle provide advantages in the manufacture of such selector sleeves by powder metallurgy, compared with those having prior art tooth geometries.

9 Claims, 4 Drawing Sheets

Section II-II

SINTERED SELECTOR OR SLIDING SLEEVE

BACKGROUND OF THE INVENTION

Field of the Invention

The invention relates to a sintered selector or sliding sleeve with lateral end faces and internal claw toothing, the teeth of which have inner tooth surfaces with a tooth depth defined by the root circle and secondary tooth surfaces which adjoin them axially on both sides. The secondary surfaces extend both radially inward and outward from the root circle and they are offset relative to the end faces.

Selector or sliding sleeves are required for gear changing in manually shifted transmissions, especially in manual motor-vehicle transmissions. The shift operation establishes a force-locking connection between the transmission main shaft and the respective gearwheel. Annular selector or sliding sleeves are bounded axially by respective end faces and, within the ring, have claw toothing by means of which the sliding sleeve is connected in a force-locking manner with the clutch element of the gearwheel on completion of the shift operation. Appropriate shaping must be employed to provide the end areas of the teeth with a functional configuration such that the axial interengagement of the synchronizer ring and the sliding sleeve during the shift operation takes place smoothly and in a trouble-free manner. The shaping of the end area of a tooth of the sliding sleeve in the area that is radially on the inside relative to the root circle is accordingly predetermined in terms of design. In the case of sliding sleeves, it is also usually only this tooth end area that has a specific configuration, i.e., the tooth end area stands out geometrically from the otherwise planar end face of the sliding sleeve.

Until only a few years ago, selector or sliding sleeves were formed from forged round steel blanks or steel rings by complex machining involving chip formation. Very recently, sleeves of this kind have also been manufactured as sintered compacts with powder-metallurgical processes. In this case, the geometrical shaping of the tooth end regions which is required by the design imposes demanding requirements in terms of press technology, which have not yet been adequately met to date and have not led to a satisfactory solution. The known technical implementations each represent severe compromises.

On the one hand it is possible to achieve adequate compressed density in the boundary areas at the ends of the teeth, these boundary areas being critical in terms of the pressing aspects. This is at the expense of extreme compaction pressures in punch areas exposed to them and leads to premature failure of punches of this kind.

Alternatively, special configurations of the boundary areas at the ends of the claw toothing are proposed, these allowing shaping of the punch which is more favorable in terms of tooling and press technology in order thereby to obtain longer punch lives but, on the other hand, leading to tooth geometries which entail disadvantages in the sequence of production of the sliding sleeve by means of powder-metallurgical methods.

Austrian patent AT 409 234 B (cf. international PCT publication WO 02/31374) describes a sintered selector sleeve of the type mentioned at the outset which, according to the object, is intended to avoid the excessively high compaction pressures and high mechanical loads on the press tools associated with known tooth geometries while at the same time allowing structural shapes for punches without filigree punch areas in the press tool, eliminating the risk that such tools may break prematurely.

This is achieved through the configuration of the teeth in the sliding sleeve, which project beyond the end faces of the sleeve body by an axial region of extension of the "roof" slopes or roof-shaped tooth flanks and, in the region of the overlap, have continuous roof slopes over a distance or height extended radially outward beyond the root circle.

Those configurations of the ends of the teeth make things easier in terms of the press technology, allegedly resulting in adequate compressed density of the powder in the critical tooth areas of the green compact and comparatively lower compaction pressures and longer punch lives.

Owing to its unprotected position, however, the "projecting" tooth end geometry has major disadvantages in the actual manufacture of such selector sleeves by powder metallurgy.

Without the protective effect of the sleeve end faces for the tooth end faces, which previously were usually in a recessed position, there is a great danger that the sleeve compacts, which are of a chalk-like softness, will suffer surface damage in that tooth area when they are being removed from the press tool and subjected to further processing up to the point when they are densely sintered, and will suffer cracks, leading to reject formation.

According to the prior publication, the tooth geometry of the sleeve allows only punch compaction pressures that are so moderate, owing to the brittleness of the materials that are typically used for press tools, that the green compacts/compacts still cannot be pressed sufficiently densely and with sufficiently uniform density in all zones. On the contrary, there is often a need for a further compaction and sizing process after the sintering operation.

Insofar as the embodiments of the gear selector sleeve described there have teeth with a "roof slope" which cover the entire end face, such selector sleeves lack a suitable datum or stop surface of the type which is extremely desirable and advantageous, especially for various mechanical processing steps in the course of sleeve manufacture.

SUMMARY OF THE INVENTION

It is accordingly an object of the invention to provide a sintered selector or sliding sleeve, which overcomes the above-mentioned disadvantages of the heretofore-known devices and methods of this general type and which proposes a configuration for the boundary regions at the ends of internal claw toothing that allows the construction of punches without filigree punch areas prone to breakage and, at the same time, exploits the advantages of a tooth shape extended radially outward beyond the root circle. At the same time, the selector sleeve is intended to have a geometry which allows powder pressing without disadvantageously high compaction pressures, combined with to a large extent uniformly compacted powder and, at the same time, creates the possibility of adequate powder flow during the pressing operation.

With the foregoing and other objects in view there is provided, in accordance with the invention, a sintered selector or sliding sleeve, comprising:

lateral end faces;

internal claw toothing formed with a plurality of teeth having inner tooth surfaces with a tooth depth defined by a root circle and secondary tooth surfaces adjoining said teeth axially on both sides;

said secondary tooth surfaces extending radially inward and radially outward from said root circle and being offset relative to said end faces;

said secondary tooth surfaces having a boundary with said inner tooth surfaces and extending axially from said boundary and terminating before or in a plane of said end faces;

said secondary tooth surfaces including outer secondary surfaces radially outward from said root circle, said outer secondary surfaces having a central zone and flank zones adjoining said central zone symmetrically on both sides, said central zone having a surface tapering in a radial direction toward said root circle, and said flank zones having curved surfaces falling away inwardly in an axial direction from said central zone; and said flank zones, at a radius level of said root circle, together with said inner tooth surface delimiting a stop surface.

In other words, the objects of the invention are achieved, in the case of a selector or sliding sleeve, by virtue of the fact that, starting from the boundary of the inner tooth surfaces, the axial extent (H) of the secondary tooth surfaces situated at the ends in each case ends before or in the plane of the end faces, that the secondary surfaces, which adjoin radially outward from the root circle, each comprise a central zone and flank zones adjoining symmetrically on both sides, that the surface of the central zone tapers in the radial direction toward the root circle, and the flank zones are designed as curved surfaces which fall away inward in the axial direction from the central zone and, at the radius level of the root circle, delimit a stop surface together with the inner tooth surface.

In comparison with the closest prior art mentioned above, the present invention has a number of significant advantages.

A particular advantage is the geometrically "protected" position of the secondary tooth surfaces. The surfaces do not project at the ends beyond the end faces and hence allow significantly simplified and economical handling of the green compact of the sleeve during manufacture, without disadvantages as regards shift synchronization, which remains good.

According to the closest prior art, the secondary tooth surfaces extend radially beyond the functional area within the root circle and furthermore radially outward beyond the root circle into a nonfunctional area.

In contrast to the prior art, however, the mechanical stresses which arise in the press tool during the shaping of the secondary tooth surfaces in the sleeve are comparatively low. The risk that the punch will break is therefore significantly reduced.

The transition zones required by the geometry between the individual secondary tooth surfaces, more specifically both between the surfaces radially to the outside of the root circle and between the outer secondary surfaces and the annular area of the end face do not or no longer represent problem zones in terms of the tooling.

Powder compaction or green-compact density that meets requirements can be achieved within the entire sleeve by means of a single powder-pressing operation.

The compaction pressures required for this do not lead to the build-up of critical tangential tensile stresses in the area of the end of the punch, which are dreaded by press experts.

Forming the stop surfaces adjoining the secondary tooth surfaces creates a datum or reference plane in the sleeve which very significantly simplifies the handling of the selector sleeves during further processing to give accurate dimensions, in particular to make the undercuts in the internal toothing for the purpose of safeguarding against pull-out.

Moreover, the formation of the surface creates a stop surface for the clutch element of the gearwheel—specifically on a level that is further in than the end face in the axial direction and is preferably parallel to the end face.

The secondary tooth surfaces situated radially to the outside of the root circle, which perform no function in the shift operation in the transmission, are each designed as a central zone and flank zones symmetrically adjoining the latter. The surfaces of individual zones can be delimited with respect to one another by edges or merge smoothly into one another.

Even in the case of the embodiments with edges, those without sharp edges are preferred, and the mutually adjoining zone surfaces should not enclose an angle that is too acute.

According to a preferred embodiment of the sleeve, the central zone is flat and aligned parallel to the end face. Equally preferred is an embodiment in which the central zone slopes in the radial direction from the radial level of the end face to the radial level of the root circle. The central zone preferably enters a ridge-like surface in the region of the secondary tooth surface in the inner area of the root circle in a stepless manner. The surfaces of the flank zones are preferably designed as surface segments of conic cylinders and thus comply with the feature of smooth transitions among the secondary tooth surfaces to a specially high degree.

The use of selector or sliding sleeves is very widespread on manually shifted transmissions. One preferred area of application is that of manual motor-vehicle transmissions. However, the area of application also extends to machine tools and mechanized conveying equipment and local transportation equipment.

Other features which are considered as characteristic for the invention are set forth in the appended claims.

Although the invention is illustrated and described herein as embodied in a sintered selector or sliding sleeve, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
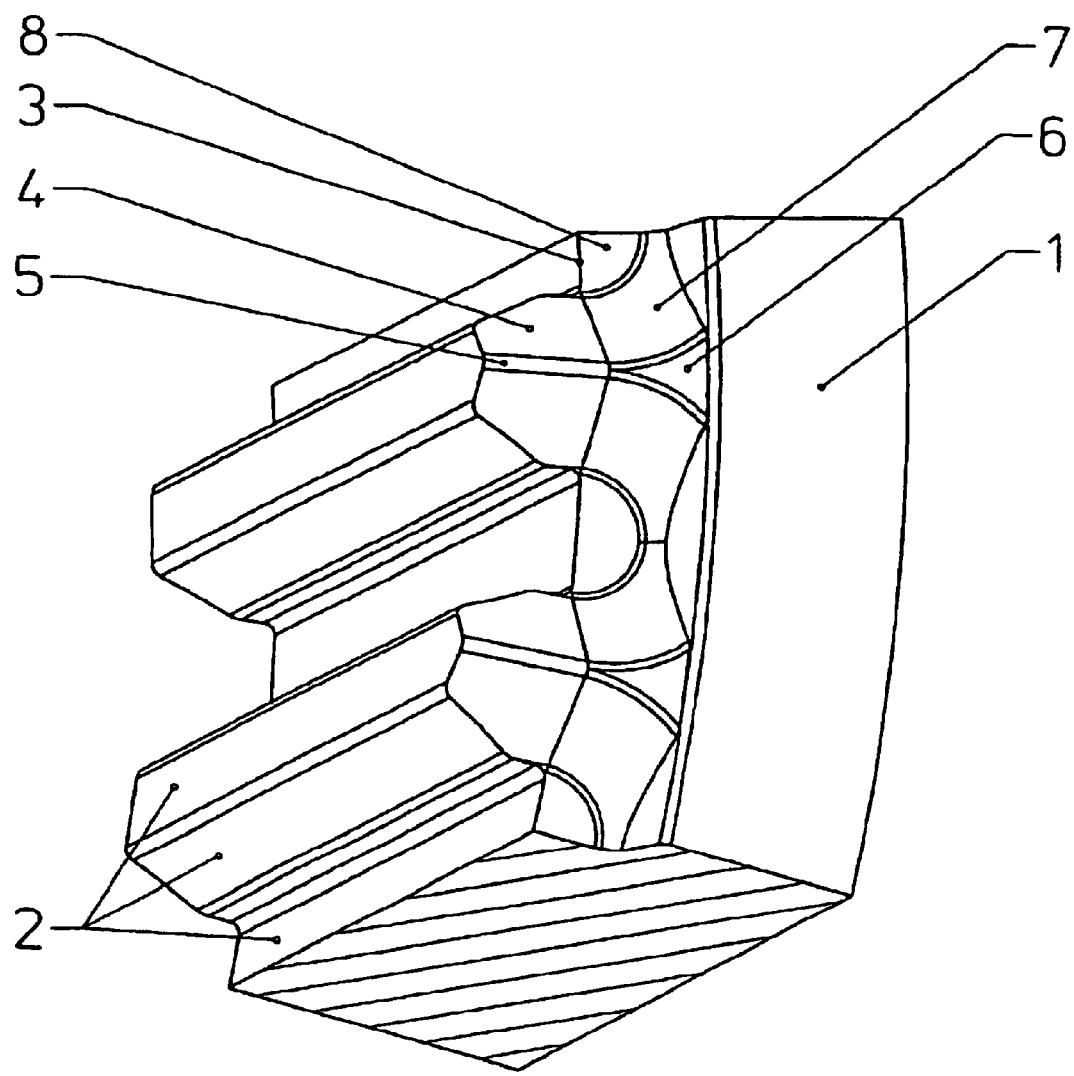
FIG. 1 is a partial perspective view of a ring segment of a sliding sleeve according to the invention.

Referring now to the figures of the drawing in detail and first, particularly, to FIG. 1 thereof, there is shown ring segment of a gear shift sleeve or selector sleeve, revealing those details of the internal claw toothing and of the axially adjoining secondary tooth surfaces that are essential to the invention.

An end face 1 delimits the annular gear shift or gear selector sleeve axially on both sides.

The tooth depth of the individual teeth of the internal claw toothing is indicated by the root circle 3. The secondary tooth surfaces 4, 5, 6 and 7 adjoin the inner tooth surfaces 2 axially on the outside. These surfaces are all particularly clearly visible in the figure.

The radial level determined by the root circle 3 in the annular selector sleeve divides the secondary tooth surfaces into surfaces 4, 5 that extend radially inward and into surfaces 6, 7 that extend radially outward.

The surfaces that extend outward, referred to globally as secondary tooth surfaces, are divided into individual zones with geometric features that are of primary importance to the invention.

In the embodiment in FIG. 1, the individual zones are delimited by edges.

Each tooth has a central zone 6 in the region of the radially outer secondary surfaces, the surface of which, when viewed in end view, tapers between the adjoining end face 1 and the radially inner secondary tooth surface, in this case more specifically the ridge-like secondary surface 5.

Adjoining the central zone 6 on both sides, symmetrically with the central zone, are respective flank zones 7, the surface of which, starting from the central zone, falls away inwardly relative to the latter in the axial direction of the sleeve.

Together with the inner tooth surface and, in this particular case, with the inner surface defined by the root circle, two such flanks enclose a stop surface 8.

Figure 2B:
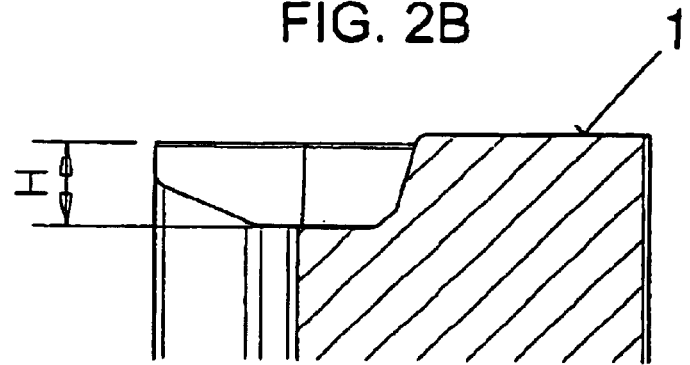
FIG. 2B is a section through the same ring segment taken along the section line II—II indicated in FIG. 2A.
Figure 2A:
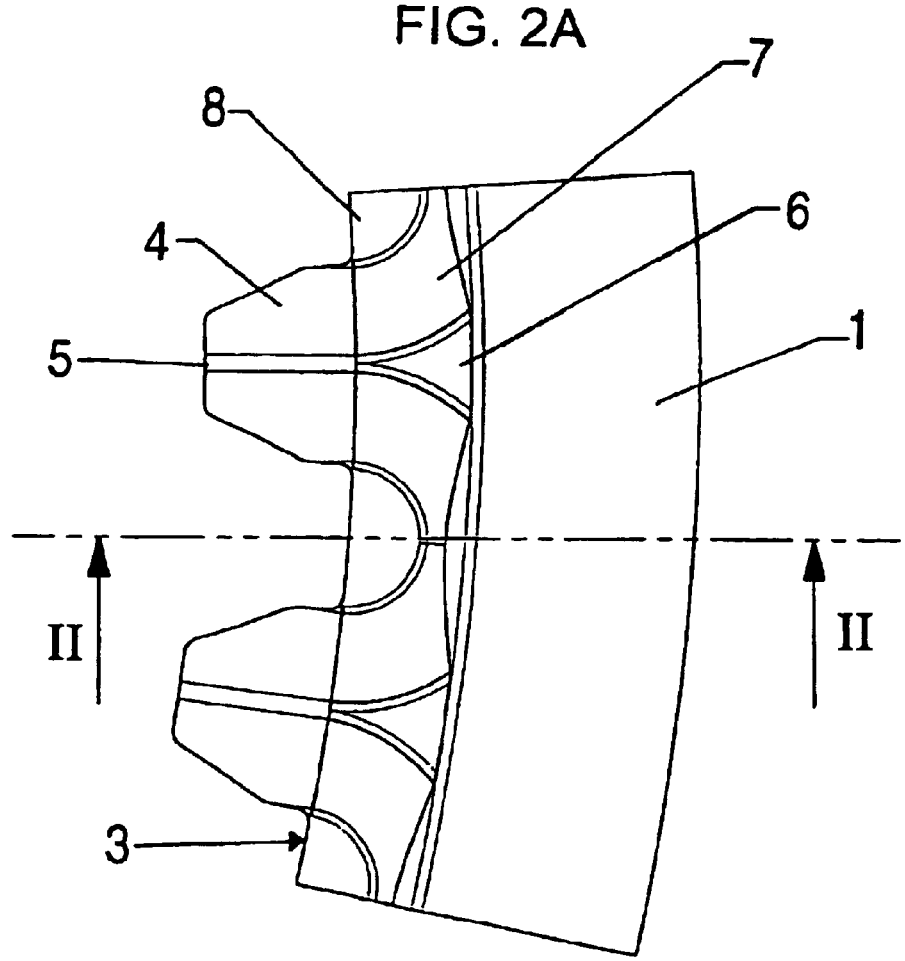
FIG. 2A is an end view of the ring segment of FIG. 1.
Figure 3:
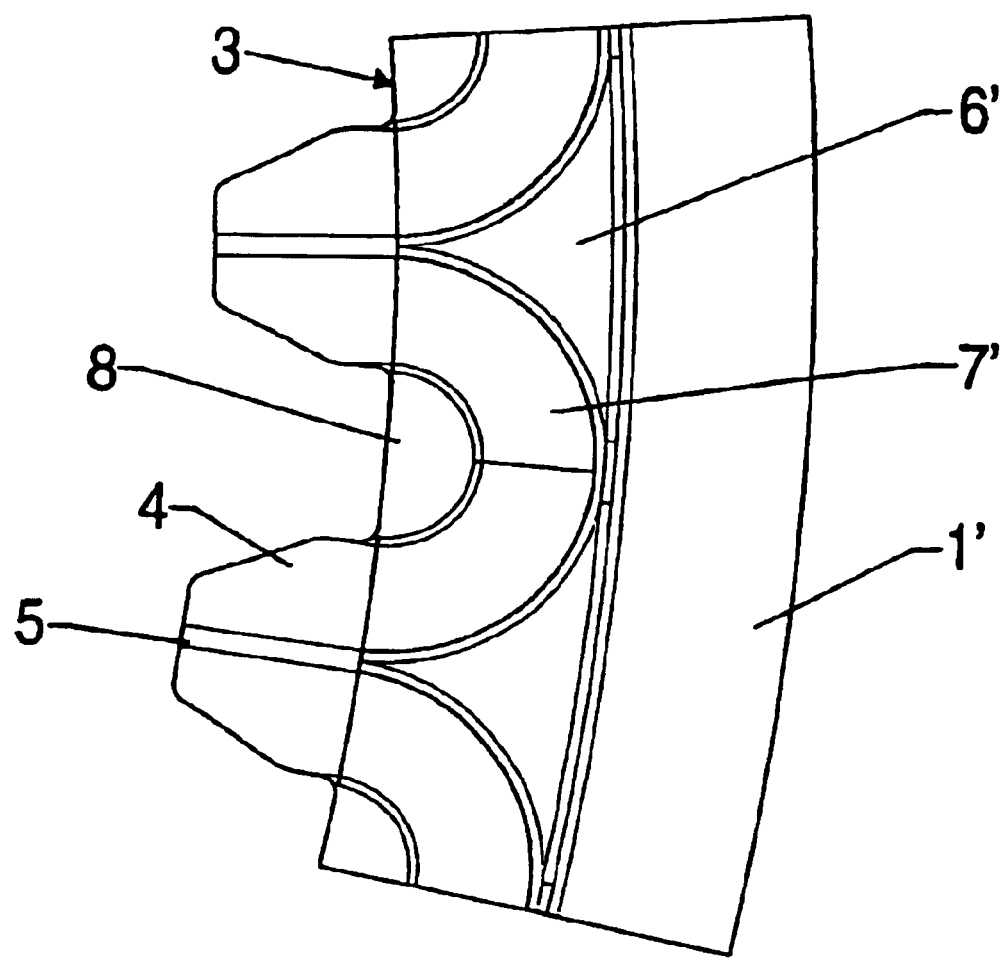
FIG. 3 is an end view similar to that of FIG. 2A, illustrating an alternative embodiment of the invention.
Figure 4:
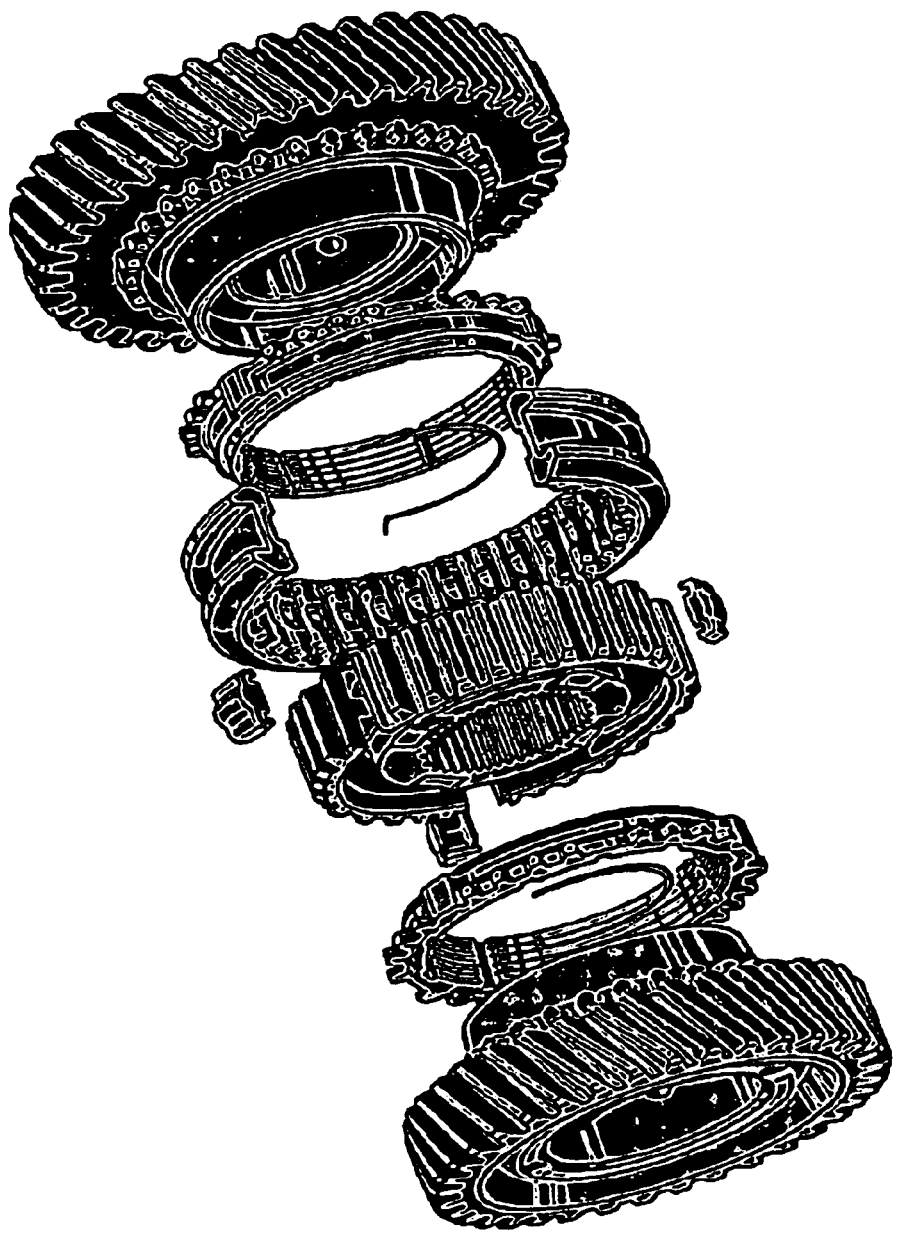
FIG. 4 is an exploded perspective view of a selector or sliding sleeve according to the invention together with the essential parts of a manual motor-vehicle transmission.

An alternative embodiment of the invention is illustrated in FIG. 3. There, the flank zone 7 and the central zone 6 are each larger than in the embodiment illustrated in FIG. 2A, for instance. The surrounding base as shown by the end face 1 is thus thinner in the embodiment of FIG. 3 than in the first-described embodiment.

We claim:

1. A sintered selector or sliding sleeve, comprising:

lateral end faces;

internal claw toothing formed with a plurality of teeth having inner tooth surfaces with a tooth depth defined by a root circle and secondary tooth surfaces adjoining said teeth axially on both sides;

said secondary tooth surfaces extending radially inward and radially outward from said root circle and being offset relative to said end faces;

said secondary tooth surfaces having a boundary with said inner tooth surfaces and extending axially from said boundary and terminating before or in a plane of said end faces;

said secondary tooth surfaces including outer secondary surfaces radially outward from said root circle, said outer secondary surfaces having a central zone and flank zones adjoining said central zone symmetrically on both sides, said central zone having a surface tapering in a radial direction toward said root circle, and said flank zones having curved surfaces falling away inwardly in an axial direction from said central zone; and said flank zones, at a radius level of said root circle, together with said inner tooth surface delimiting a stop surface.

2. The sintered sleeve according to claim 1, wherein said stop surface is aligned parallel to a respective said end face.

3. The sintered sleeve according to claim 1, wherein individual zones of said secondary surfaces are delimited with respect to one another by edges.

4. The sintered sleeve according to claim 1, wherein individual zones of said secondary surfaces merge smoothly into one another, substantially without edges.

5. The sintered sleeve according to claim 1, wherein said central zone is a flat surface and aligned parallel to a respective said end face.

6. The sintered sleeve according to claim 1, wherein said central zone slopes in a radial direction from an end thereof to said root circle.

7. The sintered sleeve according to claim 1, wherein said central zone tapers towards and enters a secondary tooth surface in an inner area of said root circle in a stepless manner.

8. The sintered sleeve according to claim 1, wherein said flank zones define surfaces formed of conico-cylindrical surface segments.

9. In combination with a manual motor-vehicle transmission, the selector sleeve according to claim 1.

* * * * *